US007028973B1

(12) United States Patent
Hibino et al.

(10) Patent No.: US 7,028,973 B1
(45) Date of Patent: Apr. 18, 2006

(54) STRUCTURE FOR FOAMING DIE FOR FORMING HEADREST

(75) Inventors: Kenzo Hibino, Akishima (JP); Tsuyoshi Tabata, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/000,980

(22) Filed: Dec. 2, 2004

(51) Int. Cl.
*E04G 9/00* (2006.01)

(52) U.S. Cl. ........................ 249/95; 425/4 R; 425/442; 425/443; 249/83; 249/66.1; 249/172

(58) Field of Classification Search ................ 425/400, 425/4 R, 442, 443; 297/391; 249/95, 83, 249/66.1, 172
See application file for complete search history.

(56) References Cited

U.S. PATENT DOCUMENTS 4,824,069 A * 4/1989 Shoji et al. .................. 249/91
5,135,593 A * 8/1992 Quirin ......................... 156/78
5,330,339 A * 7/1994 Gatarz et al. ............... 425/116
5,478,136 A * 12/1995 Takeuchi et al. ............ 297/391
5,681,087 A * 10/1997 Yamano et al. ............. 297/391
5,736,167 A * 4/1998 Chang ........................ 425/119
6,000,759 A * 12/1999 Pedronno et al. ........... 297/391
6,505,570 B1 * 1/2003 Sakamoto et al. ..... 112/470.27
6,824,373 B1 * 11/2004 Takei ......................... 425/116

FOREIGN PATENT DOCUMENTS

JP 10-329151 * 12/1998
JP 10-329151 A 12/1998
JP 11-290154 A 10/1999

* cited by examiner

*Primary Examiner*—Robert Davis
*Assistant Examiner*—G. Nagesh Rao
(74) *Attorney, Agent, or Firm*—Browdy and Neimark, PLLC

(57) ABSTRACT

A structure of foaming die for forming a generally inverted-L-shaped headrest, which is designed to receive and enclose an incomplete headrest unit comprising a hollow trim cover assembly of a generally "inverted L" shape having a horizontal upper portion and a vertical head support portion, and at least one headrest stay extending vertically from the horizontal upper portion. This die structure includes die surface portions workable for receiving and enclosing a whole of the hollow trim cover assembly. A movable die element is movably provided so as to be movable toward and away from an operative position where the movable die element is normally set to receive a back cover surface region of such head support portion, thereby allowing the movable die element to be moved away from the operative position and thus allowing a resulting headrest to be removed from the die subsequent to a foaming process.

5 Claims, 3 Drawing Sheets

STRUCTURE FOR FOAMING DIE FOR FORMING HEADREST

BACKGROUND OF THE INVENTION

1. Field of the Invention

The present invention relates to a structure of foaming die which is so designed that a hollow headrest trim cover assembly of generally inverted-L-shape and headrest stays attached thereto are placed therein for an integral foaming operation which involves injecting a liquid foaming agent into the inside of the trim cover assembly and curing it into a foam padding filled therein, and a resulting headrest can be removed therefrom subsequent to the foaming operation, wherein the generally inverted-L-shaped trim cover assembly or headrest body has a horizontal upper portion and a vertical head support portion extending vertically and downwardly from the horizontal upper portion, with the headrest stay extending donwardly from a bottom side of the horizontal upper portion.

2. Description of Prior Art

There has been known a headrest having generally "inverted L" shape as viewed from the lateral side thereof, which is basically formed by a horizontally extending upper portion and a vertically extending head support portion as stated above. This is for example disclosed from the Japanese Laid-Open Publication No. 11-290154. According thereto, a rigid plate member is bent formed into such horizontal top portion and vertical head support portion, and an upholstery is affixed on the outer side of that plate member, while a pair of stays are firmly connected with the horizontal top portion. Hereinafter, this type of headrest shall be referred to as "inverted-L-shaped headrest".

Normally, in assembly of such inverted-L-shaped headrest, a foaming process has been employed, which involves subjecting a preformed hollow three-dimensional trim cover assembly of "inverted L" shape into foaming integrally together with a headrest frame including an integral pair of stays, using a foaming die.

In this respect, there has been a problem with the foaming die in terms of placing and removing such particular inverted-L-shaped headrest with stays into and from the die. That is, in the case of the foregoing laid-open publication, the foaming die includes a die element or part disposed between the back side of the vertical head support portion of a resulting headrest and the stays extending along that vertical head support portion, as a result of which, it is rather difficult or troublesome to remove the resulting headrest with the stays from the forming die, because of the die element or part standing in the way of the vertical head support portion.

The Japanese Laid-Open Patent Publication No. 10-329151 discloses a foaming die for forming a headrest, which relates to normal headrest without vertically long head support portion and teaches provision of a separate profile retaining plate which can be set and removed into and from a foaming die, the profile retaining plate being adapted to receive a bottom side of the normal headrest within the foaming die, during foaming process. Hence, in that case, the profile retaining plate is first removed before taking out a whole resulting headrest, and therefore, it is easy to remove the resulting headrest with stays from the die. But, if it is applied to the inverted-L-shaped headrest, even the profile retaining plate can hardly be removed from the reverse side of the horizontal top portion. This is because both vertical head support portion and stays extends long from that horizontal top portion, which prevents smooth removal of the profile retaining plate or other equivalent separate die element.

SUMMARY OF THE INVENTION

In view of the above-stated drawbacks, it is a purpose of the present invention to provide an improved structure of foaming die for forming headrest, which allows a resulting headrest of a generally inverted-L-shaped configuration to be easily removed therefrom subsequent to a foaming process.

In order to achieve such purpose, in accordance with the present invention, there is basically provided a structure of foaming die for forming a headrest provided with at least one headrest stay, the headrest being of a generally inverted-L-shaped configuration, which is to receive and enclose an incomplete headrest unit comprising the at least one headrest stay and a hollow trim cover assembly of a generally "inverted L" shape conforming to the generally inverted-L-shaped configuration of the headrest, wherein the hollow trim cover assembly comprises one side portion and a head support portion extending continuous with and vertically from that one side portion, wherein such one side portion includes one cover surface region and another cover surface region opposite to the one cover surface region, wherein the head support portion includes: a head support cover surface region continuous with the afore-said one cover surface region of the one side portion; and another cover surface region opposite to the head support cover surface region, the another cover surface region being continuous with the foregoing another surface region of the one side portion, and wherein the forming die includes a means for allowing foaming agent to be injected into inside of the hollow trim cover assembly placed in the foaming die, so that the liquid foaming agent is to be cured into a foam padding filled in the hollow trim cover assembly together with the at least one headrest stay during a foaming process, thereby forming the headrest with the at least headrest stay into a resulting headrest, the structure of foaming die comprising:

- a die means having die surface portions workable for receiving and, enclosing a whole of the hollow trim cover assembly; and
- a movable die element movably provided in the die means so as to be movable toward and away from an operative position where the movable die element is to be normally set to receive such other cover surface region of the head support portion, thereby allowing the movable die element to be moved away from the operative position and thus allowing the resulting headrest from the die means subsequent to the foaming process.

In one aspect of the present invention, the die means may include a die component having an outer surface and a die surface portion defined in a side opposite to the outer surface, the die surface portion being adapted to receive the foregoing another cover surface region of the one side portion of the hollow trim cover assembly and the said another cover surface region of the head support portion of the hollow trim cover assembly. And also, the movable die element be disposed in the die surface portion of the die component, and the die component be so arranged as to allow the hollow trim cover assembly to be attached thereto, while allowing the at least one headrest stay to extend in a substantially parallel relation with the outer surface of the die component.

Other various features and effects will become apparent from reading of the descriptions hereinafter, with reference to the annexed drawings.

DETAILED DESCRIPTION OF PREFERRED EMBODIMENT OF THE INVENTION

Referring to FIGS. 1 to 6, there is illustrated an exemplary preferred embodiment of foaming die assembly (D) designed to form a generally inverted-L-shaped headrest in accordance with the present invention.

Figure 1:
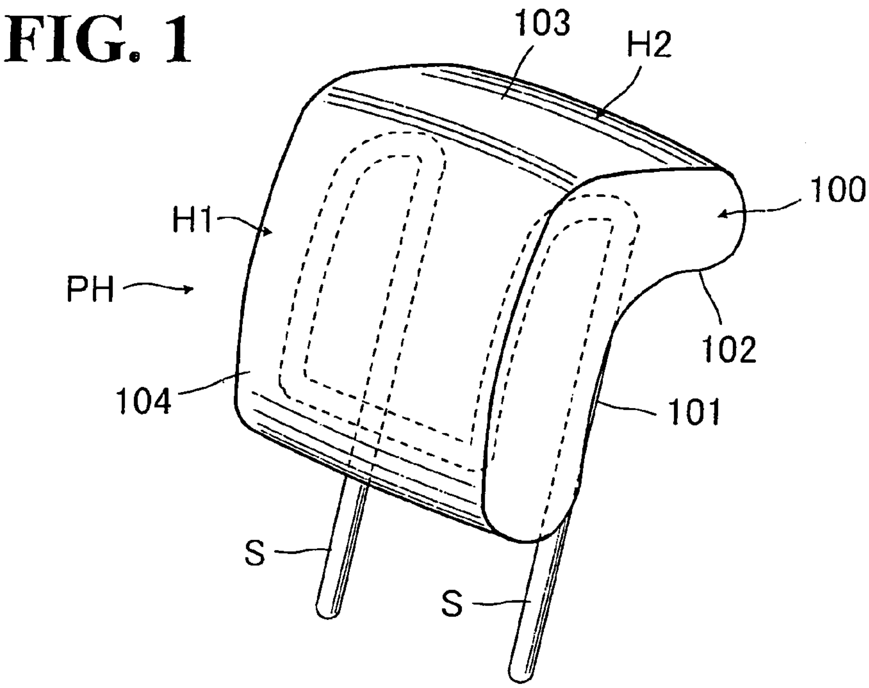
FIG. 1 is a schematic perspective view of an incomplete headrest unit of generally "inverted-L shape to be subjected to foaming by a foaming die of the present invention.

FIG. 1 shows an incomplete headrest unit (PH) of a generally inverted-L-shaped configuration with a pair of headrest stays (S) (S) attached thereto, wherein its headrest body has an upper horizontal portion (H2) and a vertical head support portion (H1), which is to be subjected to a foaming process as will be described later. The vertical head support portion (H1) is an area for supporting a head of a user (not shown).

The incomplete headrest unit (PH) comprises: a generally inverted-L-shaped hollow trim cover assembly (100), which forms a headrest body and is preformed in a generally "inverted L" shape as viewed from the lateral side thereof; and a pair of headrest stays (S) (S). Designations (103) and (102) respectively denote a horizontally extending first frontal cover surface region and a horizontally extending first back cover surface region, both of which are associated with the upper horizontal portion (H2) of incomplete headrest unit (PH). Also, designations (104) and (101) respectively denote a vertically extending second frontal cover surface region and a vertically extending second back cover surface region, both of which are associated with the vertical head support portion (H1) of incomplete headrest unit (PH).

Figure 2:
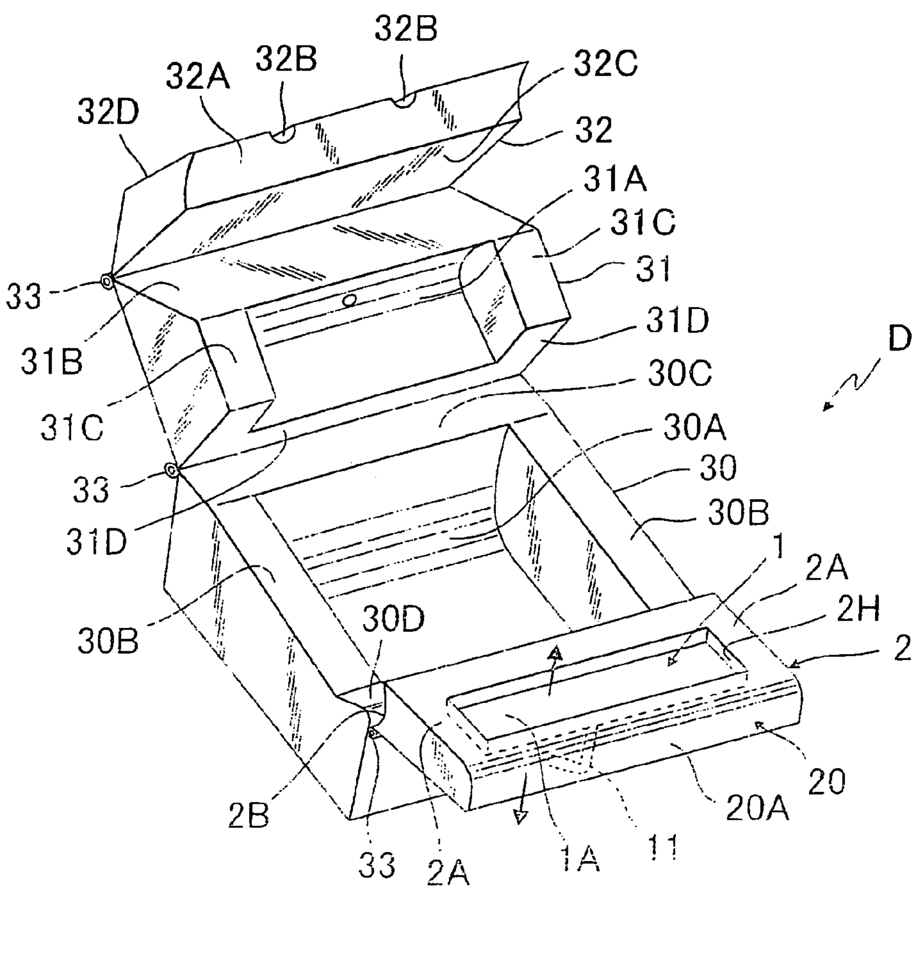
FIG. 2 is a schematic perspective view of a foaming die assembly in accordance with the present invention, which is used to subject the generally inverted-L-shaped incomplete headrest unit to foaming.

As shown in FIG. 2, in accordance with the present invention, there is provided a foaming die assembly (D) which is of a novel structure for allowing the foregoing generally inverted-L-shaped incomplete headrest unit (PH) to be set in place therein for foaming operation, and also allowing the same to be easily removed therefrom after the foaming operation.

The foaming die assembly (D) is basically formed by: a base die component (30); a first foldable die component (2) with a movable die piece (1) provided therein; a second foldable die component (31); and a third foldable die component (32).

The base die component (30) has a recessed die surface portion (30A), a pair of spaced-apart first peripheral surface portions (30B) (30B), a second peripheral surface portion (30C), and a third peripheral surface portion (30D), wherein the recessed main die surface portion (30A) is so dimensioned as to receive a substantially whole of the second frontal cover surface region (104) of trim cover assembly (100) and a substantially one half of the first frontal cover surface region (103) of the trim cover assembly (100).

The second foldable die component (31) has, defined therein, a recessed die surface portion (31A) so dimensioned as to receive a substantially another half of the first frontal cover surface region (103). As shown, further formed in this second foldable die component (31) are a flat bottom portion (31D) of generally "U" shape, a pair of spaced-apart flat lateral portions (31C) (31C), and a sloped surface portion (31B), all of which surround the main recessed die surface portion (31A). The outer edge of the bottom portion (31D) of this particular die component (31) is rotatably connected by a hinge (33) with the outer edge of the second peripheral surface portion (30C) of the base die component (30).

The third foldable die component (32) has a concave die surface (32A) so formed to receive a part of the first back cover surface region (102) of trim cover assembly (100), and also has: a sloped surface portion (32C) that can be mated with the sloped surface portion (31B); and an outer flat surface portion (32D). As designated by (32B) (32B), a pair of spaced-apart headrest stay support grooves are formed in that outer flat surface portion (32D) so as to supportively receive the two headrest stays (S), respectively, as will be explained later. As shown, the outer edge of the sloped surface portion (32C) of this particular die component (32) is rotatably connected by a hinge (33) with the outer edge of the sloped surface portion (31B) of second foldable die element (31).

In particular, in the present invention, a movable die piece (1) is provided in the first foldable die component (2).

Specifically, the first foldable die component (2) is so formed to have: a recessed area (2H) generally centrally thereof; a base portion (21) defined at a bottom side of such recessed area (2H); a peripheral surface portion (2A) surrounding the recessed area (2H); a connection end portion (2B), and a free end portion (20) having a convexly curved die surface region (20A). This first foldable die component (2) is rotatably connected at its connection end portion (20B) by a hinge (33) with the outer edge of the third peripheral surface portion (30D) of the base die component (30).

The movable die piece (1) is of such a dimensions that can be slidably accommodated in the foregoing recessed area (2H). As shown, this die piece (1) is fixed to a support plate member (1C) and a handle (11) is fixed to the support plate member (1C). The handle (11) slidably passes through the base portion (21) of first foldable die component (2), so that pushing and drawing of the handle (11) results in the movable die piece (1) being moved in a direction away from and to the recessed area (2H).

Designation (L) denotes a lock device for locking and unlocking the movable die piece (1) to and from a locked position. This lock device is a known lock device of any type that can be operated to prevent and allow movement of the handle (11) for that locking and unlocking purpose. Further description thereof is omitted.

Of course, all the peripheral lateral surfaces of the movable die piece (1) are in a dose and slidable contact with the peripheral lateral inner surfaces of the recessed area (1B). And, the movable die piece (1) per se may be slidingly moved in the recessed area (1B) to an operative position where its outer die surface (1A) is set in registry with the adjacent surface part of the convexly curved die surface region (20A) associated with the first foldable die component (2). At this point, as understandable from FIG. 3, a part of the convexly curved die surface portion (20A) and the outer die surface (1A) cooperate with each other to define a die surface for receiving the second back cover surface region (101) of the vertical head support portion (H1) of incomplete headrest unit (PH).

Now, a description will be made of operation of the above-described foaming die assembly (D) with the movable die piece (1) in accordance with the present invention.

At first, by operating the lock device (L) to a locked state, the movable die piece (1) is retained in an operative position in the first foldable die component (2), as understandable from FIG. 3, and also retained against movement due to a pressure which is to be applied thereto by an increasing mass (at FC) of liquid foaming agent (F) filled in the trim cover assembly (100) during a foaming process to be described later. At that operative position, the outer surface (1A) of the movable die piece (1) is set in registry with the adjacent surface part of the convexly curved die surface portion (20A) of first foldable die component (2), hence defining one workable die surface in the first foldable die component (2).

At this point, the first foldable die component (2) is unfolded from or not folded to the base die component (30). Now, the generally inverted-L-shaped hollow trim cover assembly (100) of incomplete headrest unit (PH) is hung and attached on the thus-unfolded first foldable die component (2), such that a part of the first back cover surface region (102) thereof rests on the convexly curved die surface region (20A) of the latter, while the second back cover surface region (101) thereof contacts the outer surface (1A) of movable die piece (1). As shown, both two headrest stays (S) are situated outside the first foldable die component (2), extending in parallel with the outer surface of that particular first foldable die component (2).

Figure 3:
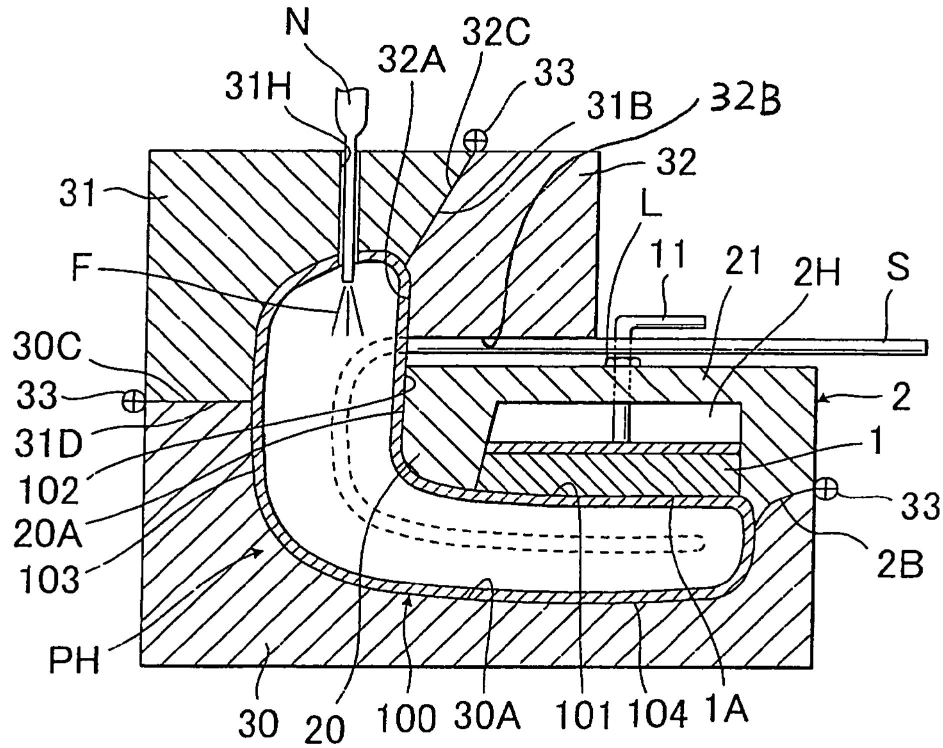
FIG. 3 is a sectional view of the foaming die assembly, which shows the state where the incomplete headrest unit is placed therein and a liquid foaming agent is injected to the inside of a hollow trim cover assembly.

Then, the first foldable die component (2) is rotated or folded down relative to the hinge (33) until the peripheral surface portion (2A) thereof contacts the first peripheral surface portions (30B) of the base die component (30), whereupon the first foldable die component (2) is set at a folded operative position, as shown in FIG. 3, and therefore, the trim cover assembly (100) of incomplete headrest unit (PH) is placed in the recessed die surface portion (30A) of the base die component (30), with an entirety of the second frontal cover surface region (104) thereof and a part of the first frontal cover surface region (103) being laid thereon. At this point, another parts of the first frontal and back cover surface regions (103) (102) are exposed from the base die component (30) and first foldable die component (2).

Thereafter, the second foldable die component (31) is folded about the hinge (33) in a downward direction to the base die component (30), while at the same time, the third foldable die component (32) is folded about the hinge (33) in the likewise downward direction. Consequently, referring to FIG. 3 in conjunction with FIG. 2, it is seen that the U-shaped bottom portion (31D) of the second foldable die component (31) contacts the peripheral surface portions (30B and 30C) of the base die component (30), that the sloped surface portion (32C) of the third foldable die component (32) contacts the sloped surface portion (31B) of the second foldable die component (31), and that the outer surface portion (32D) of the third foldable die component (32) contacts on the outer surface of the first foldable die component (2). Hence, the remaining parts of the first frontal and back cover surface regions (103) (102), which have been exposed from the base die component (30) and first foldable die component (2), are now enclosed by and contacted with the die surfaces (31A and 32A) of the second and third foldable die components (31) (32), and also, both headrest stays (S) are partway enclosed and retained by the two headrest support grooves (32B), respectively.

Figure 4:
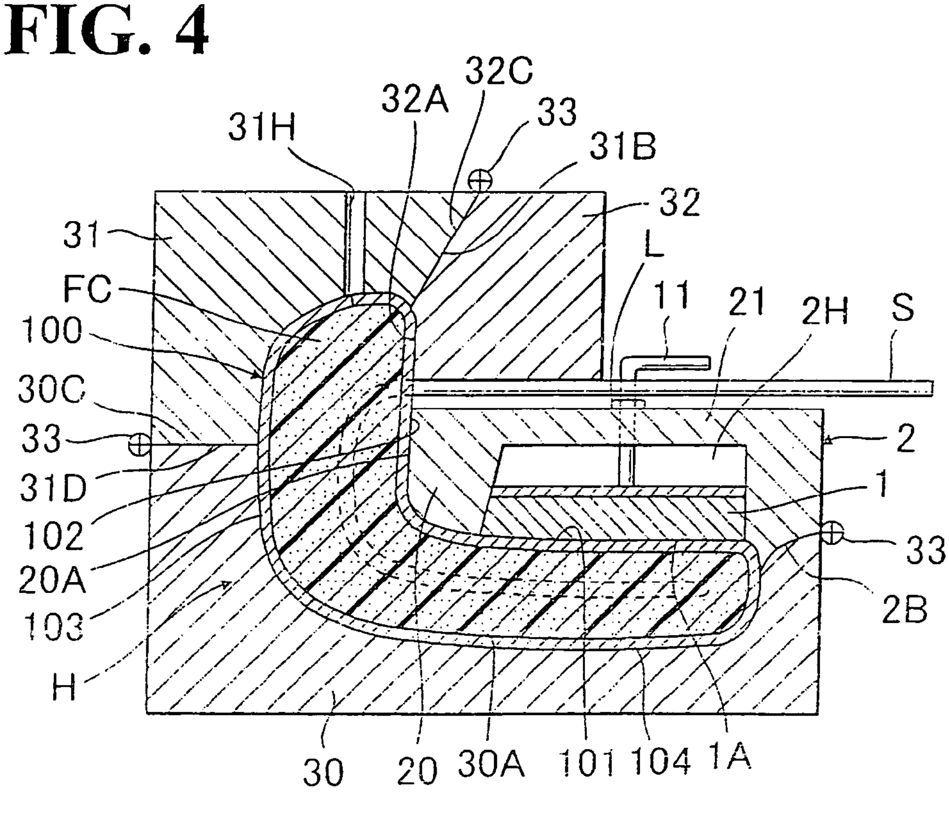
FIG. 4 is a sectional view of the foaming die assembly, which shows that a foaming has been effected in the foaming die assembly to form a resulting inverted-L-shaped headrest.

Next, an injection nozzle (N) is inserted through the hole (31H) of the second foldable die component (31) and a foaming agent (F) is injected via the nozzle (N) into the inside of the trim cover assembly (100), and, as shown in FIG. 4, the foaming agent (F) is cured and foamed to create an increase mass of foam padding (FC) filled in the trim cover assembly (100), whereupon a resulting headrest (H) is produced.

Figure 5:
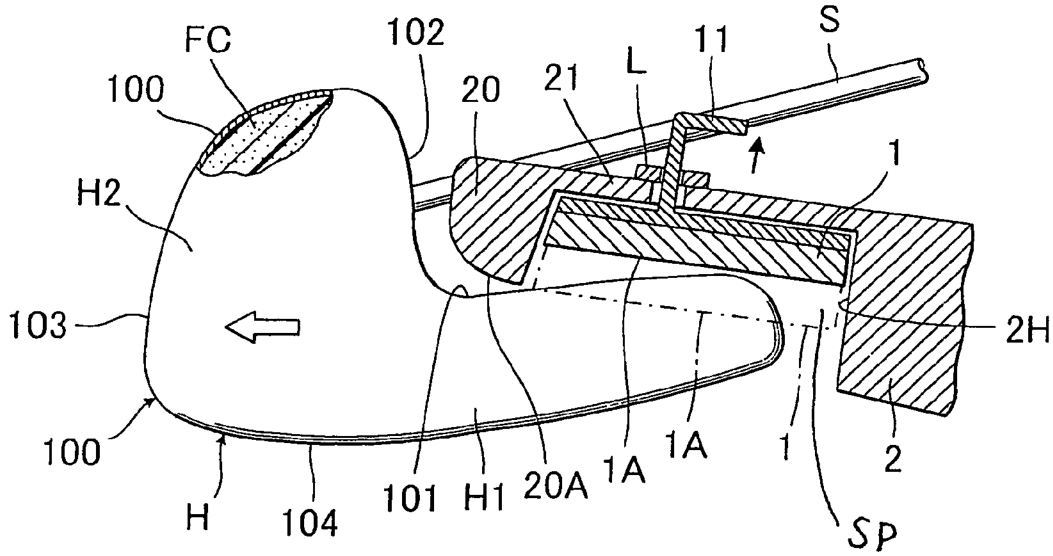
FIG. 5 is a partly broken side view with a fragmentary section showing a principal part of the invention and also showing how to remove the resulting inverted-L-shaped headrest from a first foldable die component of the foaming die assembly.

After the completion of such foaming process, both second and third foldable die components (31) (32) are unfolded or rotated upwardly about their respective hinges (33), and, as indicated in FIG. 5, the movable die piece (1) is unlocked by operation of the lock device (L) and withdrawn into the recessed area (2H) of the first foldable die component (2) by drawing the handle (11) outwardly in the direction of arrow.

Accordingly, as seen in FIG. 5, a recessed space (SP) is attained in the recessed area (2H) by an amount corresponding to the distance at which the movable die piece (1) is withdrawn into the recessed area (2H), which effectively allows the end of vertical head support portion (H1) of headrest (H) to enter that recessed space (SP). Thus, a worker can easily remove a whole of the headrest (H) from the first foldable die component (2) by inclining the headrest stays (S) relative to the die portion (20) in a direction wherein the end of vertical head support portion (H1) enters the recessed space (SP) as shown in FIG. 5. In this regard, this removal operation can easily be done with a small force required on the worker's side due to a principle of leverage where a fulcrum of the headrest stays (S) is disposed forwardly at the die portion (20) of first foldable die component (2).

Figure 6:
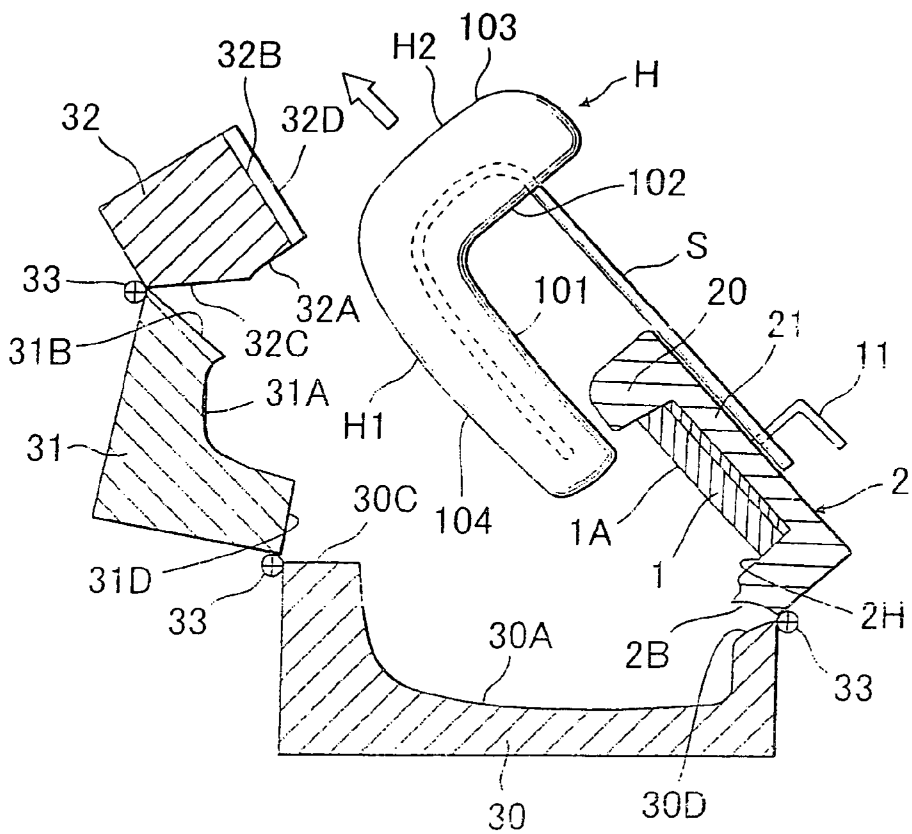
FIG. 6 is a section view showing the state where all movable die components of the foaming assembly are unfolded from a base die component and the resulting inverted-L-shaped headrest is about to be removed therefrom.

Then, as shown in FIG. 6, both second and third foldable die elements (31) (32) are completely unfolded or rotated outwardly from the way of the headrest (H), so that a whole of the headrest (H) can be smoothly taken out from the foaming die assembly (D).

In addition to the novel provision of the movable die piece (1), the above-described arrangement of the first, second and third foldable die components (2) (31) (32) relative to the base die component (30) provides a great improvement in facilitating the ease with which the generally inverted-L-shaped headrest (H) with stays (S) can be removed from the die assembly (D).

Further, the headrest support grooves (32B) are formed in a die component, such as the third foldable die component (32), which is to be mated with the foldable die component (at 2) on which the headrest (H) with stays (S) are to be attached. This die arrangement effectively insures to easily locate and set the incomplete headrest unit (PH) in a predetermined position for foaming process.

While having described the present invention, it should be understood that the invention is not limited to the illustrated embodiment, but any other replacement, modification and addition may be applied thereto without departing from the scopes of the appended claims.

What is claimed is:

1. A foaming die that forms a headrest having an inverted L-shaped configuration with at least one headrest stay;

wherein said headrest has a horizontal portion and a vertical head support portion extending from said horizontal portion;

wherein said at least one stay has a first portion extending into said vertical head support portion, a second portion extending through said horizontal portion and a third portion extending out from said horizontal portion and parallel to said first portion;

wherein said foaming die receives and encloses a headrest unit comprising said at least one headrest stay and a hollow trim cover assembly corresponding to the inverted L-shaped configuration of the headrest;

said hollow trim cover assembly comprising:

a horizontal cover portion corresponding to said horizontal portion of said headrest and a vertical head support cover portion corresponding to said vertical head support portion of said headrest;

said vertical head support cover portion extending continuous with and vertically from said horizontal cover portion;

wherein said horizontal cover portion includes a front horizontal cover surface region and a back horizontal cover surface region opposite to said front horizontal cover surface region;

wherein said vertical head support cover portion includes a front vertical head support cover surface region and a back vertical head support cover surface region opposite to said front vertical head support cover surface region; and wherein said foaming die includes an access for a liquid foaming agent to be injected into an inside of said hollow trim cover assembly engaged in said foaming die when closed so that the liquid foaming agent can cure into a foam padding filled in said hollow trim cover assembly together with the third portion of said at least one headrest stay extending through said closed foaming die to form the headrest;

wherein said foaming die has a plurality of die components, each having a die surface and hinged together to close and engage a whole of said hollow trim cover assembly when filled against said die surfaces;

wherein a first die surface of a first die component engages said back vertical cover surface region while the third portion of said headrest stay extends over an outer surface of said first die component when the foaming die is closed and said hollow trim cover assembly is filled;

wherein said first die component includes a movable die element slidably engaged therein having a die surface which is a portion of the die surface of the first die component and also engages said back vertical cover surface region when the foaming die is closed and said hollow trim cover assembly is filled; and wherein said movable die element is movable away from said back vertical cover surface region subsequent to injection of the liquid foaming agent so as to define a recessed space in said first die component and above said back vertical cover surface region which facilitates removal of a cured headrest.

2. The foaming die according to claim 1, wherein said first die component has a second die surface which engages said back horizontal cover surface region when the foaming die is closed and said hollow trim cover assembly is filled.

3. The foaming die according to claim 1, wherein a surface of a second die component engages the outer surface of said first die component when the foaming die is closed, said surface of said second die component having a groove through which said third portion of said headrest stay extends out of the foaming die over said outer surface of said first die component.

4. The foaming die according to claim 1, wherein a handle fixed to said movable die element extends through said outer surface of said first die component to permit moving said movable die element upward to define said recessed space.

5. The foaming die according to claim 4, wherein said handle can be locked to form a continuous fixed die surface on said first die component.

* * * * *